Aug. 15, 1967  H. L. SEEKINS ET AL  3,336,528
FLOW DETECTION APPARATUS INCLUDING A CONTACT MEMBER
HAVING A PAIR OF CLOSELY SPACED PLATES
Filed Oct. 18, 1962
2 Sheets-Sheet 1
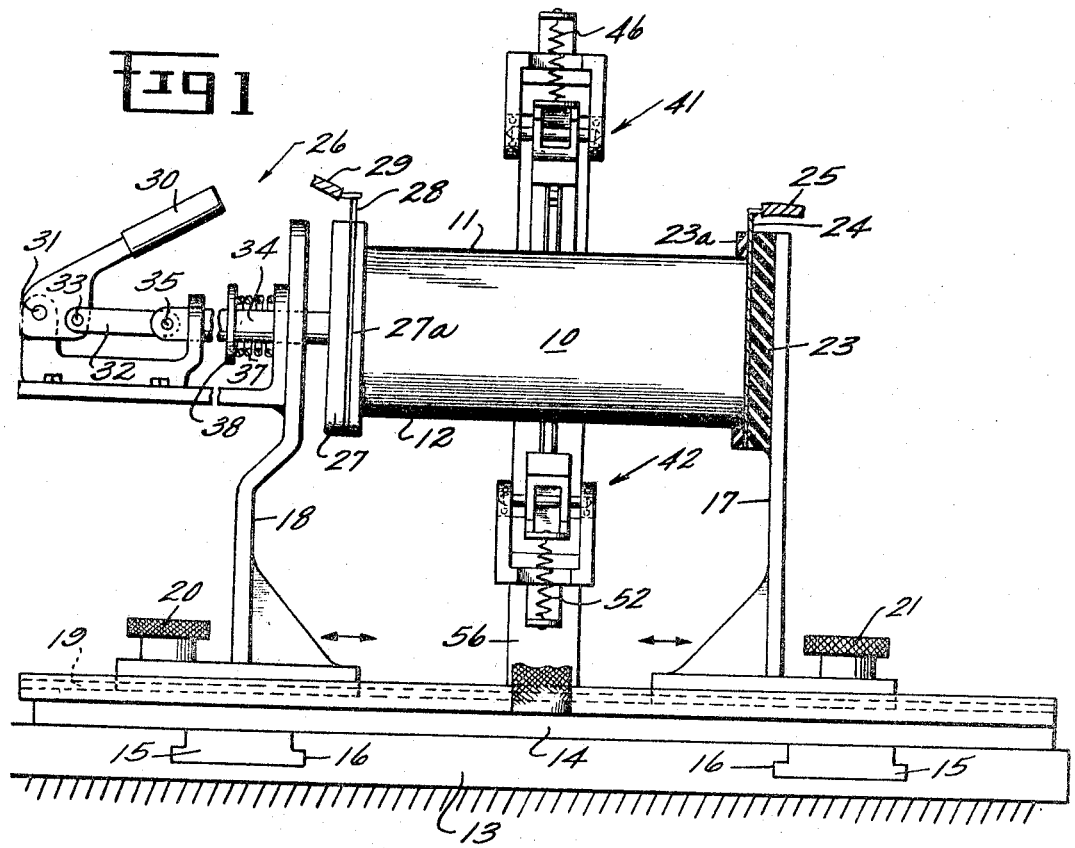
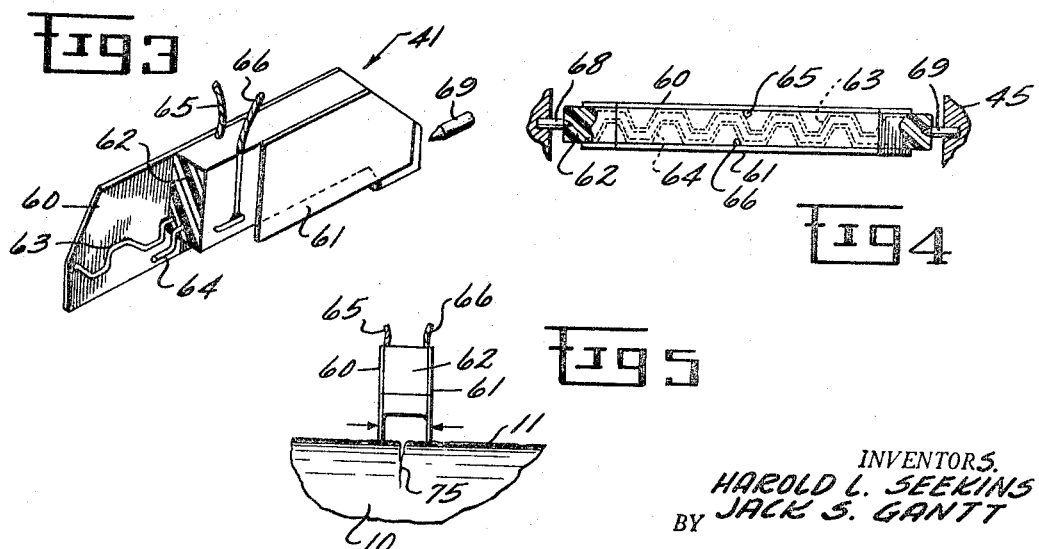
INVENTORS.
HAROLD L. SEEKINS
BY JACK S. GANTT
Gerald L. Moore
ATTORNEY-

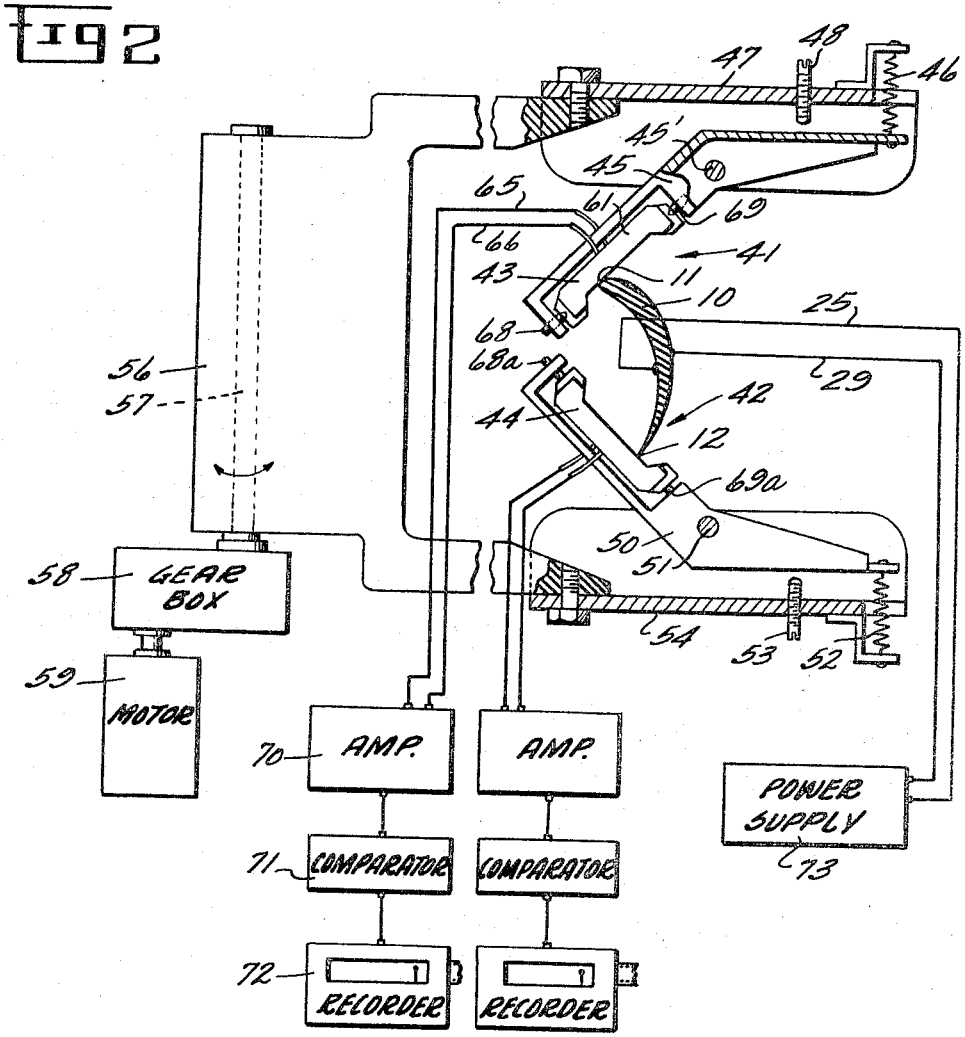

United States Patent Office 3,336,528
Patented Aug. 15, 1967

3,336,528
FLAW DETECTION APPARATUS INCLUDING A CONTACT MEMBER HAVING A PAIR OF CLOSELY SPACED PLATES
Harold L. Seekins and Jack S. Gantt, Cincinnati, Ohio, assignors to General Electric Company, a corporation of New York
Filed Oct. 18, 1962, Ser. No. 231,337
3 Claims. (Cl. 324—64)

This invention relates to an inspection probe and more particularly to a probe to be utilized with a voltage potential type inspection means for inspecting conductive materials.

In the manufacture of various articles it is extremely important and generally difficult to detect minute cracks or flaws in the finished product. There are various reasons for this difficulty including the fact that the cracks may be extremely small yet seriously affect the structural integrity of the part; or the cracks or flaws may be sub-surface and not detectable by a visual means nor by any method which increases the visibility of surface cracks or flaws such as fluorescent penetrants. The detection of these flaws is especially important in the gas turbine field and in particular in the airfoils which are subjected to the hot gases flowing through the engine. This is because these airfoils are subjected to extreme temperatures and vibrational stresses. Various methods of inspecting such parts have been pursued, however, one in particular involves the passing of a current through a conductive workpiece which establishes a voltage gradient or voltage potential difference along the workpiece due to the electrical resistance of the workpiece. To utilize this voltage gradient in detecting flaws, etc. it is necessary to measure the various voltage potentials along the part, naturally where a flaw, crack or discontinuity occurs this causes a point of higher resistance to current flow and therefore a higher voltage gradient will be detected across this discontinuity to indicate the presence of such flaw or crack. However difficulties have arisen in measuring this voltage gradient and detecting the changes thereof since the voltage differences are generallly quite small. Attempts have been made to detect the voltages by an induction coil but the controlling of the distance between the workpiece and coil is very critical. Probes directly contacting the workpiece have also been tried but surface roughness, contour, etc. can strongly affect the measurement of the voltage gradient at the various points sufficiently to make the detection of any voltage gradient change difficult.

It is therefore one object of this invention to provide a contact type inspection probe for measuring voltage gradients along a workpiece.

It is a further object of this invention to provide an inspection probe for use with such electrical measuring apparatus which will allow the probe contacts to accurately follow the contour of the workpiece and detect the voltage potential along the part.

In accordance with one embodiment of the invention there is provided a means for detecting flaws, etc. in a workpiece by measuring the voltage potential along an electrical conductive workpiece comprising means for supporting the workpiece and interjecting a current flow therethrough, and a contact means for intimately contacting the workpiece having two closely spaced contact points being supported in such a manner as to allow for movement in a plurality of planes of the contact with electrical conductors attached to each separate contact in a manner to allow the voltage potential at these contacts to be detected, with circuit means for detecting and transmitting the differential voltage measured to the inspection apparatus where this voltage may be recorded in a manner to allow for detection of any erratical change in the voltage gradient which might indicate a flaw in the workpiece being tested.

Other objects and many of the attendant advantages of this invention will be readily appreciated as the same becomes better understood by reference to the following detailed description when considered in connection with the accompanying drawings wherein:

FIG. 1 is a front view of the inspection probe assembly,

FIG. 2 is a side view of the inspection probe assembly, partially in section,

FIG. 3 is a partially cut away view of the contact,

FIG. 4 is a cross-sectional view of the contact, and

FIG. 5 is an end view of the contact positioned on a part.

Referring first to FIGS. 1 and 2 therein is illustrated the inspection probe assembly of the subject invention in which is mounted a workpiece 10. In this instance the workpiece 10 is an airfoil for a turbomachine having a leading edge 11 and a trailing edge 12 which are desired to be inspected to determine if any cracks or flaws exist, either surface or sub-surface, which might affect its operation in a turbomachine. The inspection probe assembly consists of a base 13 on which is mounted a plate 14 having projections 15 extending and fitting into slots 16 in the base 13 so as to allow movement in one direction across the base. On the plate 14 are mounted upright mounts 17 and 18 which are supported within a slot 19 in the plate so that they may be moved to vary the distance therebetween, each has a set screw 20 and 21 which may be tightened to clamp the respective upright mount in a stationary position.

The upright mount 17 supports an insulating face plate 23 with an electrode plate 24 mounted thereon to contact the workpiece 10, a conductor 25 is fastened to the electrode 24. The upright mount 18 supports a clamping fixture 26 which supports the insulation plate 27 for movement toward the workpiece 10. The plate 27 has incorporated therein an electrode 28 to contact the workpiece, a conductor 29 is attached to the electrode. The insulator pieces 23 and 27 include face plates 23a and 27a which have cut-out portions fitting the contour of the airfoil so that when the clamping means moves the face plate 27 toward the clamped airfoil between the two face plates, airfoil fits firmly within these cut-out portions and against the electrodes 24 and 28.

The clamping means consists of a handle 30 pivotally supported about a pin 31 and attached to a link 32 by a pin 33. The link 32 is also pivotally attached to the shaft 34 by pin 35 to which is attached the insulation plate 27. By pivoting the handle 30 about the pin 31 the link 32 is forced into alignment with the shaft 34 to move the plate 27 into contact with the workpiece 10 to clamp the workpiece in testing position. The spring 37 extending between the flange 38 on the shaft 34 and the upright support 18 biases the clamping fixture in the unclamped position and the clamping means may be locked into clamping position against the action of this spring by the over center alignment of the pins 31, 33 and 35.

It may be seen thus far that the blade or workpiece being tested is supported between the upright supports 17 and 18 and insulated from the conductive base with electrodes 24 and 28 contacting the workpiece to allow current to be passed therethrough. However current flow could be introduced in other ways, for instance by induction with equally applicable use of the subject probe. As explained heretofore to detect any flaws within the workpiece it is necessary to detect the voltage gradient of the workpiece, in this instance this is accomplished by traversing a pair of contacts across the workpiece and detecting the voltage differential between the probes which will erratically change with a discontinuity, etc. within the workpiece.

Turning now to FIG. 2 there is illustrated a dual contact assembly comprising probe assemblies 41 and 42 supporting contacts 43 and 44 so that they contact the workpiece under a spring loading force and may be traversed across the workpiece to locate any discontinuities therein in the manner previously set forth. However as pointed out before it is extremely important that close and continuous contact be maintained between the contacts and the workpiece and that the workpiece have the capability of closely following the workpiece so as to reduce any change in signal resulting from a varying contact resitsance, etc. Furthermore, where a dual contact assembly is illustrated and described, it should be understood that a single probe assembly could also be used.

In FIG. 2 may be seen the contact member 43 supported from a contact arm 45 which pivots about a shaft 45' and is spring loaded to bias the contact against the workpiece by spring 46 extending between the support arm 47 and the contact support 45. A set screw 48 allows for a stop adjustment on the contact arm. Similarly contact 44 is supported from a contact support arm 50 pivoting about a shaft 51 which is spring loaded by a spring 52 and includes a set screw 53 extending from the support member 54. The support members 47 and 54 are in turn supported from a singular support 56 which is fastened by a shaft means 57 to a gear box 58 and motor 59. In this manner the complete assembly may be actuated from left to right in FIG. 1 to traverse the complete length of the workpiece or any specific section of the workpiece in any manner desired.

Turning now to the contact member as illustrated in FIGS. 3 through 5, the contact consists of a pair of plate contacts 60 and 61 separated by an insulator block 62 with conductors 63 and 64 embedded therein with attached conductors 65 and 66 leading from the contact assembly. It will be noted that the conductors 63 and 64 are periodically attached to the plate contacts 60 and 61 in a manner to reduce any effect of the plate contact resistance from the circuit. For instance if the plate contact contacted the workpiece at an outer edge and the conductors 65 and 66 only fasten at the center then the resistance of the circuit would be changed from that wherein the plate contact contacted the workpiece at the center of the plate. The contact is supported within the contact support by pintles 68 and 69 for the contact 43 and 68a and 69a for the contact 44 in a manner to allow for rotation of the contact for close following of the workpiece contoured surface. The plane of the contact edges is very near to that of the pintles to allow easy turning of the contacts.

As illustrated in FIG. 2 the two conductors 65 and 66 lead to an amplifier 70 which amplifies the voltage signal received from the two plate contacts 60 and 61 and in turn feed them to a comparator 71 where the differential voltage between the two is determined in any well known manner to thereafter be fed into the recorder 72 wherein this differential is recorded in a manner such as by an ink tracing on a graph. A similar system may be provided for each probe utilized, for instance such a system is provided for probe 42 to allow the inspection of two edges of the airfoil in one operation.

It may be seen then that by utilization of a power supply 73 to provide for current flow through the conductors 25 and 29 to the workpiece 10 by reason of the fact that the plate contacts are an equal distance apart a relatively steady state voltage differential should be detected by the plate probes while the voltage itself will vary because of the resistance change within the circuit due to the traversing of the contacts along the workpiece. However as illustrated in FIG. 5 as the contacts pass over some discontinuity such as the crack 75 in the workpiece, a change in resistance is immediately encountered in the workpiece resulting in a change in voltage between the plate contacts 60 and 61. This in turn is detected by the comparator 71 and recorded on the recorder 72 to indicate a probable discontinuity or flaw within the workpiece. The plate contacts are made very thin so that they will only contact the workpiece in one plane so as not to change the effective distance between the plate contacts during traversal along the workpiece due to an uneven surface of the workpiece. Also the plate contacts are very thin so that the unit pressure between these contacts and the workpiece will be sufficiently high to penetrate any surface contamination, such as foreign substances and oxides on the workpiece, this is essential to maintain a relatively low electrical resistance between the workpiece and each plate contact. Further, since the contacts are light weight therefore the inertial effects on the contacts are lessened providing for better tracking of the contacts.

By use of the precise contact support mechanism and contacts it may be seen that the sensitivity of the overall testing system is magnified because of the precise speed of tracking as provided by the specific support illustrated and the precise spacing of the contact plates due to the specific contact construction. Also due to the contact support means the circuit may be tuned for high sensitivity because the surface contact resistance remains substantially constant due to the close tracking by the precise spring loaded and gimbal construction of the contact support mechanism and the high unit pressure between the contact and workpiece. While herein has been illustrated a dual probe assembly to allow for speedier checking of parts or checking of parts in multiple points, lines or planes at one time it should be understood that the precise probe mechanism works equally well whether just one or more probes are employed.

While particular embodiments of the invention have been illustrated and described, it will be obvious to those skilled in the art that various changes and modifications may be made without departing from the invention and it is intended to cover in the appended claims all such changes and modifications which come within the true spirit and scope of the invention.

What is claimed as new and desired to be secured by Letters Patent of the United States is:

1. Flaw detection apparatus including voltage detection means and comprising:
   means for clamping opposite ends of a workpiece and passing current therethrough to establish a voltage gradient therealong,
   a contact member having a pair of closely spaced plates which have sharp, elongated edges normal to the length of the workpiece,
   means for guiding said contact member from one end of the workpiece to the other,
   means mounting said contact member for free pivotal movement about axes parallel to said edges and said direction of movement,
   means yieldably urging said contact member into engagement with said workpiece, and
   means connecting said plates to said voltage detection means,
   whereby an incremental voltage measurement can be made successively along the entire length of the workpiece irrespective of changes in its contour as found on the leading or trailing edges of an airfoil and thereby identifying any flaws in the workpiece which cause changes in the incremental voltage measurements made therealong.

2. Flaw detection apparatus as in claim 1 wherein the means mounting said contact member comprise:

a support arm movable lengthwise of said workpiece,
a contact arm pivotally mounted on said support arm about an axis parallel to the movement of said support arm, and
pivots disposed intermediate said blades and mounting said contact member on said contact arm.

3. Flaw detection apparatus as in claim 1 wherein the contact member further comprises:
an insulating block between said contact plates and electrical conductors are secured to said plates at portions spaced along their lengths adjacent said sharp edges, and
the means connecting said plates to said voltage detection means are connected to said conductors,
whereby the electrical resistance of said plates has a minimal effect on the voltage increment measured by said voltage detection means.

References Cited

UNITED STATES PATENTS

| | | | |
|---|---|---|---|
| 957,020 | 5/1910 | West | 324—62 |
| 1,426,620 | 8/1922 | Vawter | 324—62 |
| 2,133,725 | 10/1933 | Sperry et al. | 324—64 |
| 2,186,826 | 1/1940 | Edgar | 324—64 |
| 2,195,504 | 4/1940 | Stone | 324—64 |
| 2,199,106 | 4/1940 | Jones | 324—64 |
| 2,683,250 | 7/1954 | Fredrickson | 324—64 |
| 2,867,771 | 1/1959 | Renault et al. | 324—158 |
| 2,977,533 | 3/1961 | Savage | 324—65 X |

RUDOLPH V. ROLINEC, *Primary Examiner.*

WALTER L. CARLSON, *Examiner.*

W. H. BUCKLER, E. E. KUBASIEWICZ,
*Assistant Examiners.*